United States Patent [19]

Fuchs

[11] Patent Number: 4,524,139
[45] Date of Patent: Jun. 18, 1985

[54] PROCESS FOR THE COMPRESSIVE REGENERATION OF FLEXIBLE, POROUS MATERIALS

[75] Inventor: Uwe Fuchs, Munich, Fed. Rep. of Germany

[73] Assignee: Linde Aktiengesellschaft, Wiesbaden, Fed. Rep. of Germany

[21] Appl. No.: 467,007

[22] Filed: Feb. 16, 1983

[30] Foreign Application Priority Data

Feb. 16, 1982 [DE] Fed. Rep. of Germany ....... 3205377

[51] Int. Cl.³ ..................... B01J 20/34; B01D 41/02; C02F 3/10; B30B 9/06
[52] U.S. Cl. .................................... 502/22; 100/70 R; 100/72; 100/116; 134/25.1; 210/270; 210/350; 210/351; 210/618; 210/785; 210/786; 210/792
[58] Field of Search ................... 502/20, 22; 210/618, 210/785, 786, 792, 350, 351, 270; 134/25.1

[56] References Cited

U.S. PATENT DOCUMENTS

| 2,089,214 | 8/1937 | Lomax | 100/70 R |
|---|---|---|---|
| 4,055,490 | 10/1977 | Hasegawa et al. | 210/616 |
| 4,137,162 | 1/1979 | Mohri et al. | |
| 4,387,633 | 6/1983 | Ballantyne | 100/116 |
| 4,419,243 | 12/1983 | Atkinson | 210/618 |

FOREIGN PATENT DOCUMENTS 0086437 8/1983 European Pat. Off. ............ 210/350

Primary Examiner—P. E. Konopka
Attorney, Agent, or Firm—Millen & White

[57] ABSTRACT

This invention relates to a process and apparatus for the compressive regeneration of flexible, porous materials used as filter particles, oil-separating particles or carrier particles in a reactor. These materials are loaded in a reactor with a liquid containing substances to be removed. The liquid is, for example, water, and the substances are, for example, deposited solids, oil droplets or bacteria. After the flexible, porous materials become loaded with the substances, they are conducted to a press chamber equipped with a press means. The transporting, squeezing out, and separation of the water and substances from the flexible porous materials, as well as the recycling of the regenerated material into the reactor are achieved by either a one-time, or a repetitive to and fro movement, of the press means. This regeneration is accomplished with a single device which operates simultaneously as both a regenerating press and as a conveying installation.

27 Claims, 7 Drawing Figures

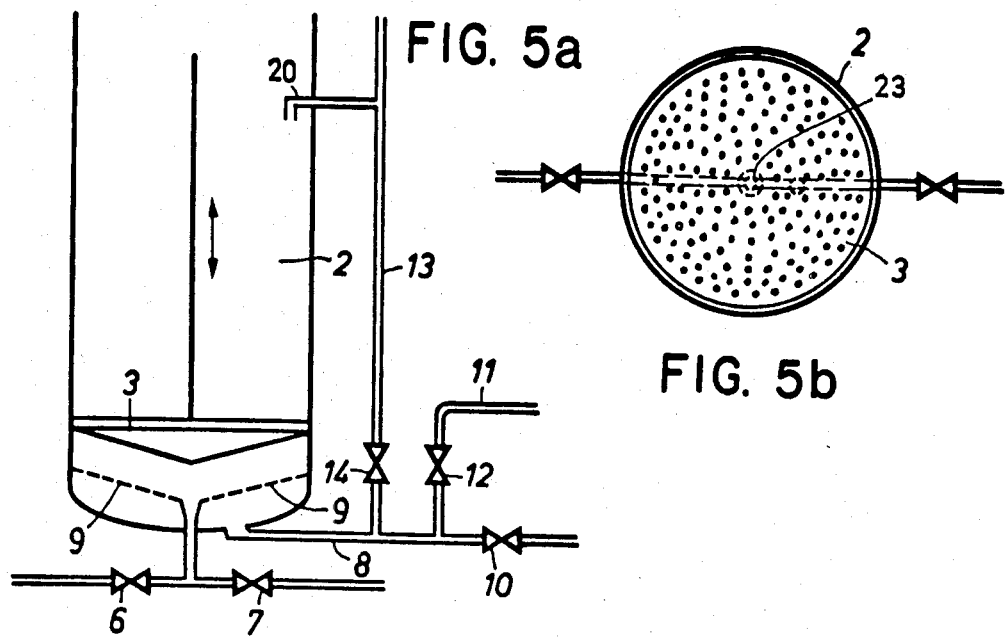
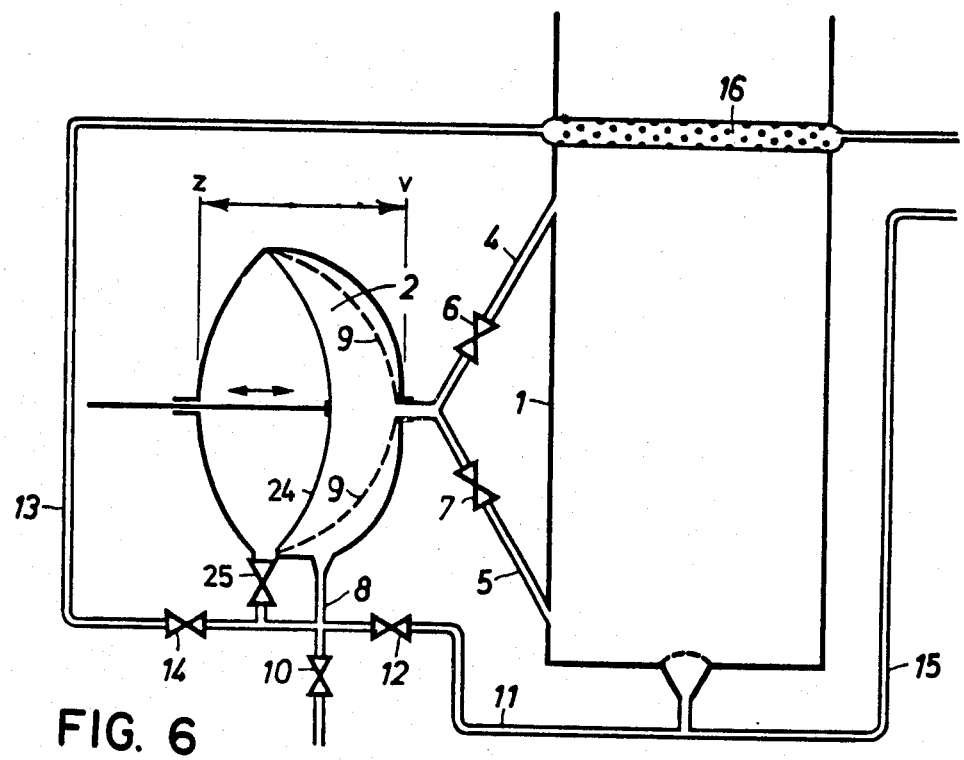

PROCESS FOR THE COMPRESSIVE REGENERATION OF FLEXIBLE, POROUS MATERIALS

BACKGROUND OF THE INVENTION

This invention relates to a process and apparatus for the compressive regeneration of flexible, porous materials typically employed as filter particles, oilseparating particles and/or carrier particles. These materials are loaded into a reactor along with substances to be removed from liquids such as water. Such substances are, for example, deposited solids, oil droplets and/or bacteria. After the particles become loaded with the above-discussed substances, they are conducted to a press chamber equipped with a press means for regeneration therein.

Filtration has long been one of the primary methods in the field of liquid and wastewater treatment for eliminating suspended solids from liquid streams. More recently, it has become known to employ as filter media, such materials as open-cell, porous members made of synthetic polymers, and in particular, foam materials as discussed in "Biological Fluidised Bed Treatment of Water and Wastewater" [1981], pages 272-283 P. F. Coope and B. Athinson. More particularly, the use of polyurethane foam is especially advantageous from the viewpoint of operation of the systems because of its high solids absorption capacity, resultant low pressure drop losses, high resistance to clogging, and its ability to eliminate large amounts of undissolved, organic dirt particles from liquid streams.

It is also known to employ polyurethane foam as a substrate material for bacteria required in biological activation processes conducted in wastewater treatment, as a coalescing medium in the removal of undissolved, liquid hydrocarbons from process waters and wastewaters, and in fermenting techniques.

However, since polyurethane particles employed in these systems eventually become loaded with the substances to be removed over the course of time, regeneration of the particles is necessary to maintain a high process efficiency. During regeneration, the materials which are retained inside the pores of the particles, such as deposited solids, oil droplets, or bacteria, must be removed therefrom to as complete an extent as possible, and must be separated from the material, i.e., polyurethane particles, as well as from any adhering water. After regeneration, the regenerated material must be returned to the reactor, e.g., in case of a cocurrent reactor the material is returned at the head, and in case of a countercurrent reactor the material is returned into the bottom zone. To achieve transportation to and from the reactor and regeneration zones, it is necessary to employ expensive auxiliary conveying devices such as mammoth pumps, conveying screws, conveyor belts, and other installations for transporting the polyurethane particles.

SUMMARY OF THE INVENTION

It is therefore an object of the present invention to provide an improved process and apparatus for the compressive regeneration of flexible, porous materials employed in various types of reactors while eliminating the need for auxiliary conveying devices for transporting the materials between a regeneration zone and the reactor.

It is another object of the invention to provide a process and apparatus for the compressive regeneration of flexible porous materials employed in reactors, such as open-cell, porous members of synthetic polymers, and especially foam materials, which process is highly economical.

Upon further study of the specification and appended claims, further objects and advantages of this invention will become apparent to those skilled in the art.

In accordance with the invention, the material loaded with the substances to be removed, together with the liquid from the reactor, is sucked or drawn into a press chamber by means of a rearward movement of a press means which is employed in this instance to create a vacuum effect. Subsequently, the liquid, and the substances to be removed, are pressed out of the material in the press chamber by a forward movement of the press means. Liquid employed as a carrier for transporting the material (hereinafter "transport" liquid) is then drawn into the press chamber by another rearward movement of the press means, and is followed by another forward movement of the press means thereby forcing the thus-regenerated material back into the reactor.

The material to be regenerated, together with the liquid, which in most instances is water, is conveyed from the reactor into the press chamber by means of the suction force exerted by the rearward movement of the press means. In the press chamber, the material is compressed by the forward movement of the press means and initially, only the water adhering to the material is pressed out and discharged. As a result of an additional compression, the substances to be removed are also forced out of the pores of the loaded material. Thereby, the water and the substances to be removed are separately eliminated from the material and a compressed regenerated material is obtained. By means of a subsequent rearward movement of the press means, transport water is drawn in either from the reactor, or from a source of fresh water, by the resulting suction effect, so that the compressed particles of the material are again expanded and distributed within the transport water. The particles can then be readily returned into the reactor, by an appropriate positioning of associated blocking elements, i.e., valve elements, with another forward movement of the press means.

Consequently, the conveying, squeezing out, separation of the water from the impurities, and returning of the regenerated material into the reactor are accomplished according to the process of the invention by means of a relatively simple, single apparatus. The described device operates simultaneously both as a press, and as a conveying installation, and by employing this device in the process of this invention, permits elimination of the prior art customary and necessary transporting devices. Thus, the device and process result in a considerable cost reduction. The invention also provides the advantage that the same regenerating plant can be employed with countercurrent as well as cocurrent flow reactors. Moreover, by automating the regenerating steps, continuous regeneration is possible.

In another aspect, the invention provides that, after filling the press chamber, the water is squeezed out of the loaded material by a partial forward movement of the press means. Then, water is sucked in either from the reactor or from a fresh water source by means of a partial subsequent rearward movement of the press means in order to clean the material by flushing. Subsequently, a forward movement of the press means presses both the water and the substances to be removed out of the material. This mode of operation permits a fine cleansing of the loaded material, especially when a series of multiple repetitive steps of compression and expansion, with the simultaneous taking in of flushing water, are conducted. By fine cleansing is meant that 90% or almost all of the undesired substances are removed. In a highly advantageous mode, the flushing water, especially when fresh water is employed, is forced into a space downstream of the press means in the press chamber so that no additional storage space is required for the flushing water. In the process, it is especially advantageous, for squeezing out the water and the substances to be removed, to compress the loaded material to a volume of about 20-5%, preferably 15-7%, of its expanded volume.

According to another preferred embodiment of the process of the invention, compressed air is blown into the transport water during the recompression of the regenerated material distributed in the transport water. This ensures that the particles of the material are broken up and are more advantageously dispersed in the transport water after the compression to facilitate recycling into the reactor.

The invention also comprises an apparatus for conducting the above-described process. Accordingly, a reactor is associated with a press chamber equipped with a press means. The improvement resides in providing the press chamber connected by respective material conveying conduits, each having a blocking element, i.e., valve, associated therewith, with the respective conduits connected to the upper and lower portions of the reactor. Furthermore, there is also provided a blockable discharge conduit for the water and the substances to be removed connected to the press chamber, and a blockable feed means for the transport water. The press chamber includes retaining means associated with the discharge conduit for the water and substances to be removed for preventing the loss of the material to be regenerated.

It is preferred that the feed means for the transport water connects into the discharge means for the water and the substances to be removed from the press chamber, with the feed means for the transport water being advantageously connected with the discharge of the reactor. According to another embodiment of the apparatus of this invention, a compressed air conduit is provided connected to the feed means for the transport water.

The press means is, according to the invention, preferably a press piston, ram, or plunger, but alternatively, this press means can also be a diaphragm press. The stroke velocity of the press means is preferably within the range 0.01-0.5 m/sec, more preferably 0.1-0.2 m/sec.

The retaining means for the material to be regenerated is preferably a perforated plate or screen plate comprising 1-5, preferably 3, holes per 10 $cm^2$ and the holes having a diameter of 2-10 mm, preferably 3 mm, depending on the carrier particle size to be regenerated. These dimensions ensures that the material, preferably present in comminuted form, is not carried out of the regenerating plant together with the water and the substances to be removed.

In order to prevent clogging of the material-conveying conduits with loaded or regenerated material particles, the conduits should have a diameter of at least 10 cm, and preferably a diameter of 10-30 cm.

The process of this invention and the apparatus for conducting this process are suitable for the regeneration of all kinds of flexible, porous filter materials, oil-depositing materials and/or carrier materials, such as, in particular, polyurethane foam and open-cell, porous elements based on polyethylene, polypropylene, and silicone. More particularly, the device is especially adapted to regenerate a carrier of a 15-100 hg/$m^3$ foam density when dry, 95-90 vol % compressibility and particle size of at least 3-50 mm in diameter, preferably 10-20 mm. The process can also be utilized as a harvesting method for fermenting processes where the use of the foam material is as a filtering or carrier material for the product of the fermenting process.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 5 shows a special conical shape press plunger in side view;

FIG. 5b shows a top view of the conical press plunger of FIG. 5a; and

FIG. 6 shows a regenerating apparatus, especially adapted for cocurrent and countercurrent reactors, operating with a diaphragm press.

DETAILED DISCUSISON OF THE INVENTION

Figure 1:
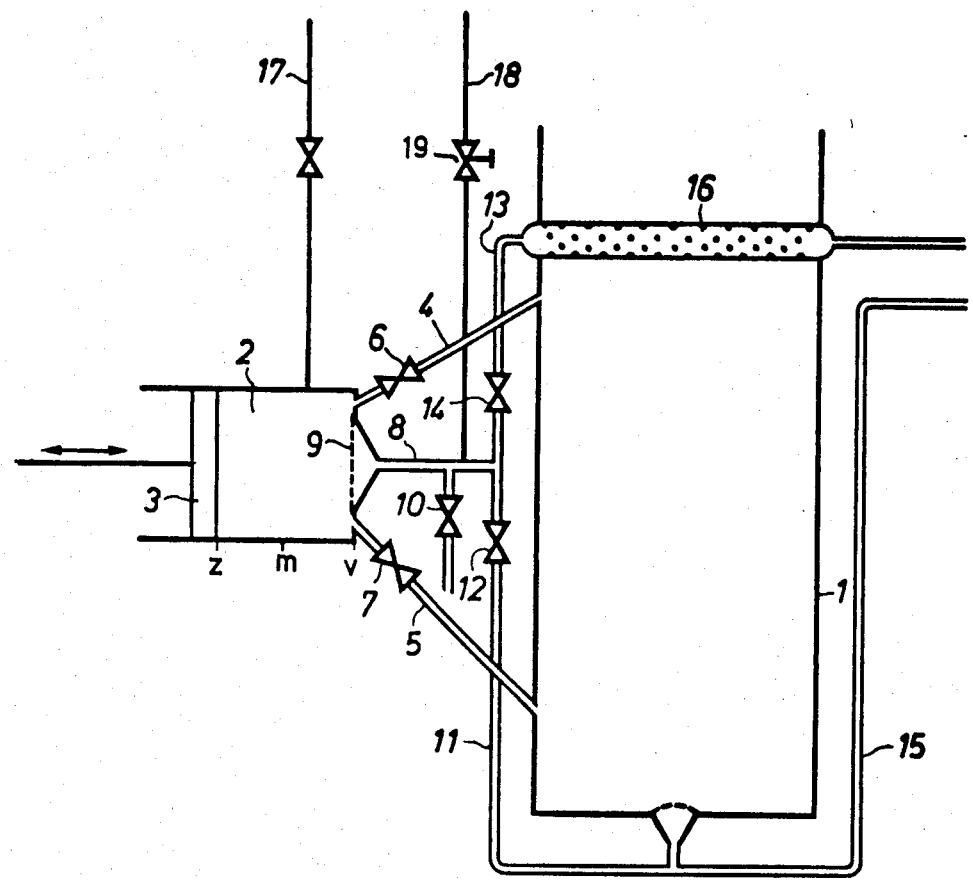
FIG. 1 is a schematic view of a regenerating apparatus, especially adapted for cocurrent and countercurrent reactors, operating with a press plunger or piston device with horizontal compression in accordance with the invention.

The regenerating apparatus shown in FIG. 1 includes a reactor 1 operable in a cocurrent as well as in a countercurrent mode, a press chamber 2 having press plunger 3, material conveying conduits 4 and 5 including blocking elements 6 and 7, i.e., valves, a discharge conduit 8 having a perforated plate 9 at the connection to the press chamber 2, and valve 10. Feed means 11 with valve 12 are also provided for countercurrent operation and, respectively, a feed means 13 with a valve 14 for cocurrent operation.

The feed means 11 is connected to the discharge means 15 for countercurrent operation, and feed means 13 is connected to the discharge means 16 for cocurrent operation of the reactor. Cocurrent operation is understood to mean that air, and the water entering to be purified, are conducted into the reactor from the bottom, whereas in countercurrent operation the water is fed from the top and the air is fed from the bottom into the reactor.

The process conducted in accordance with this invention will now be explained in detail for a countercurrent reactor as shown in FIG. 1. Flexible, porous material, serving as the filtering, oil-depositing and/or carrier material, is located in the reactor 1 and becomes loaded with substances such as, in particular, deposited solids, oil droplets and/or bacteria present in the liquid, in most instances water, fed from above, which substances are to be removed from such liquid. (Typically, during operation air is sparged into the reactor from the bottom for, e.g., enhancing biological mass transfer and/or improving mixing in the reactor 1.) After the porous material becomes fully loaded, it must be regenerated from time to time or on a continuous basis to ensure proper functioning of the reactor.

To achieve regeneration, the valves, or blocking elements, which are ordinarily closed, are controlled so that the valve 6 is opened, and the press plunger or piston 3 is moved from forward position v into rearward position z (i.e., a rearward movement) while valve 6 is opened so that, due to the suction generated by the movement of the press plunger 3, the material particles loaded with substances from the liquid in the reactor 1, are conveyed into the press chamber 2 together with water from the reactor 1. As discussed previously, the material particles are, for example, polyurethane foam particles. Then the valve 6 is closed and valve 14 is opened while the press plunger 3 is simultaneously moved from the rearward position z to the middle position m (i.e., from z to m). During this step, the water entrained into press chamber 2 is pressed out and admixed via conduit 13 with the wastewater entering to be purified, and fed into the countercurrent reactor 1. Thereafter, the valve 14 is again closed.

To refill the press chamber 2, the valve 6 is opened, the press plunger 3 is moved from the middle position m into the rearward position z, and thereby, additional loaded material and water is taken in from the reactor 1. Thereafter, the valve 6 is closed, valve 14 is opened, the press plunger 3 is moved from the rearward position z into the middle position m, thereby removing the water and feeding this water through conduit 13 into the inlet to the reactor 1. Then, valve 14 is closed, valve 10 is opened, and the press plunger 3 is moved from the central position m into the forward position y, i.e., the loaded substances are squeezed out of the particles, with the particles being preferably compressed to 20-5% of its expanded volume, more preferably 15-7%. During this step, the substances to be removed are pressed out of the material particles and removed through conduit 8 and through open valve 10. The perforated plate 9, during this step, prevents the material particles from being entrained with the substances discharged and retains them in press chamber 2. If these discharged substances are, for example, deposited solids, these are fed as excess sludge to, for example, a thickener. In the case of other substances, these are further processed in accordance with their properties and the type of process conducted in reactor 1.

After the substances have been squeezed out of the loaded material particles, valve 10 is closed and valve 12 is opened so that carrier or transport water is taken in by a rearward movement of the press pistons (from v to z) in the press chamber through conduit 11 which is connected to the discharge means 15 of the countercurrent reactor. Alternatively, fresh water can be drawn in through a supply conduit 17 connected directly to the press chamber 2. The thus-regenerated material particles are thereby expanded and simultaneously distributed in the entering carrier or transport water. Normally, transport water is taken in in a quantity coorresponding to 10-80%, preferably 20-50% of the volume of the press chamber. In order to enhance expansion and distribution, compressed air can also be blown in through a compressed air conduit 18 connected to conduit 8. This flow of compressed air is controlled by means of an inlet valve 19. Normally, 50-250 Nm$^3$air/m$^3$ press chamber, preferably 100-150 Nm$^3$ air/m$^3$ press chamber are blown in. As soon as the press chamber is filled with carrier or transport water, valve 12 is closed, valve 7 is opened, and the press plunger 3 is moved from the rearward position z into the forward position v so that the regenerated material particles distributed in the transport water are returned into the lower portion of reactor 1 together with the transport water through the conveying conduit 5.

In this mode of operation, it is advantageous to move the press at a speed of about 0.01-0.5 m/sec, more preferably 0.1-0.2 m/sec. The drive mechanism employed to move the plunger 3 is conventional and can be a mechanical type device for example, by spindle or rack is conventional, or it can be a hydraulic mechanism. Furthermore, the press chamber 2 should be dimensioned so that the proportion of the maximum length of piston displacement to piston diameter is no greater than 3:1. In order to prevent clogging of the blocking elements, i.e., valves 6 and 7, they are preferably adapted to respond with maximum speed during opening and closing and should have a large cross section. More specifically, By means an additional, short-term feeding of air or discharge water, the blocking elements, i.e., valves, can be flushed free in the event they are clogged, to permit free closing and/or opening thereof. It is also desirable to provide material conveying conduits 4 and 5 having a short length relative to their diameter so that clogging with material particles can be avoided. A diameter of the conveying conduits of at least 10 cm, preferably 10-30 cm, and more preferably is preferred.

Table I shows the regenerating steps discussed above in correspondence with the various valve and piston positions for countercurrently as well as cocurrently operated reactors with reference to FIG. 1. In this connection, it is noted that the discharge means 16 is in the upper portion of the reactor for cocurrent operation.

TABLE I

| Step | Procedure | Ram Movement | Countercurrent Valve Position | Cocurrent Valve Position |
| --- | --- | --- | --- | --- |
| 1 | Fill press chamber with water and particles from reactor | v → z | 6*,7,10,14,12 | 6,7*,10,14,12 |
| 2 | Remove water from press chamber | z → m | 6,7,10,14*,12 | 6,7,10,14,12* |
| 3 | Refill press chamber with water from reactor | m → z | 6*,7,10,14,12 | 6,7*,10,14,12 |
| 4 | Remove water from press chamber | z → m | 6,7,10,14*,12 | 6,7,10,14,12* |
| 5 | Squeeze out substances to be removed from particles | m → v | 6,7,10*,14,12 | 6,7,10*,14,12 |
| 6 | Take in transport water | v → z | 6,7,10,14,12* | 6,7,10,14*,12 |
| 7 | Return material particles to reactor | z → v | 6,7*,10,14,12 | 6*,7,10,14,12 |

Figure 2:
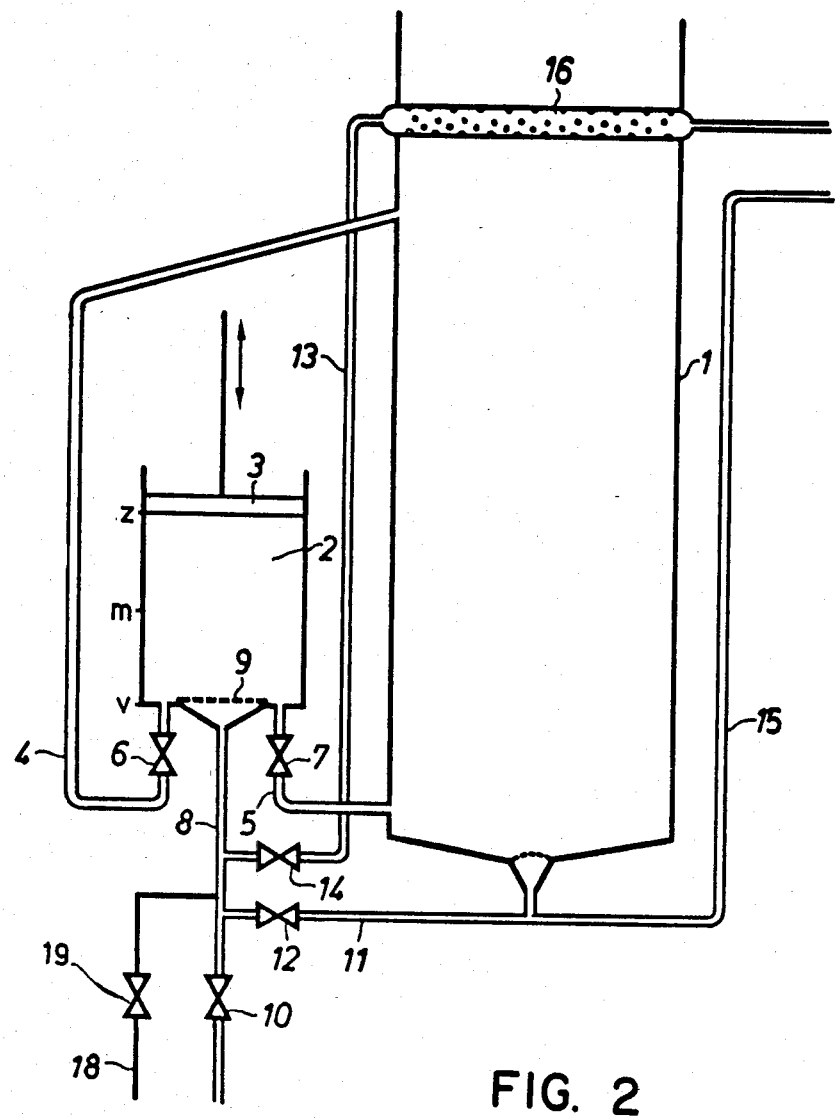
FIG. 2 shows an apparatus as above with the press plunger adapted for vertical compression.

Valves denoted by * are open while the other valves are closed.
z = Ram in rearward position
m = Ram in middle position
v = Ram in forward position The regenerating apparatus illustrated in FIG. 2 corresponds to the aforedescribed apparatus in FIG. 1, with the sole difference being that a vertical compression, as opposed to horizontal, is carried out. The sequence of steps shown in Table I applies.

Figure 3:
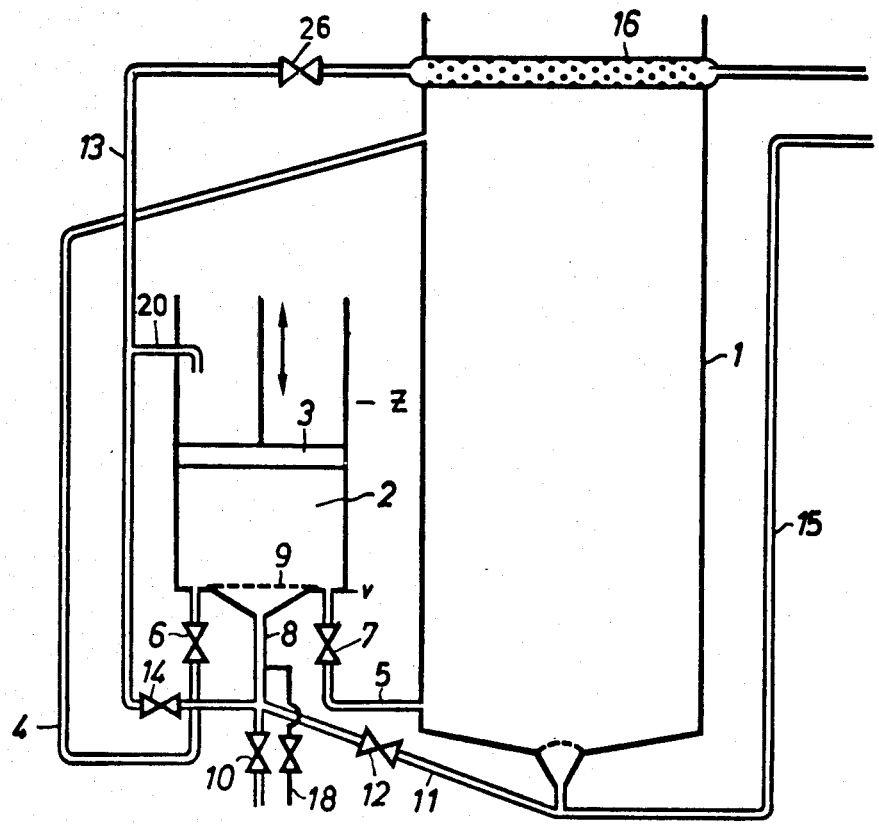
FIG. 3 shows a regenerating apparatus adapted to achieve a fine degree of regeneration employing the press plunger adapted for vertical compression.

The apparatus schematically illustrated in FIG. 3 is also similar to the regenerating arrangement of FIG. 1, but is adapted for achieving a fine regeneration. This device includes a tap line 20 connected to conduit 13, leading into the rearward press chamber, and through this tap line, as a result of the reciprocating movement of the press ram, water is conducted to and from the press chamber to the rearward press chamber for cleansing the material particles by flushing. A valve 26 is shown in FIG. 3. As is clear from the positioning of the valve 26, the operation thereof is such that it would be closed except for a step corresponding to fine cleansing, when flushing water is to be used.

Another difference noted when compared to the apparatus of FIG. 1 is that the press piston can only be moved into an extreme forward position v and an extreme rearward position z. An apparatus for fine regeneration with horizontal compression similar to that of FIG. 3 can also be employed, but has not been illustrated separately. Table II shows the regenerating steps for fine regeneration as conducted in the apparatus of FIG. 3.

TABLE II

| Step | Procedure | Ram Movement | Countercurrent Valve Position | Cocurrent Valve Position |
|---|---|---|---|---|
| 1 | Fill press chamber with water and particles from reactor | v → z | 6*,7,10,14,12 | 6,7*,10,14,12 |
| 2 | Cleanse material particles by flushing | v ←→ z | 6,7,10,14*,12 | 6,7,10,14,12* |
| 3 | Squeeze out substances to be removed from particles | z → v | 6,7,10*,14,12 | 6,7,10*,14,12 |
| 4 | Take in transport water | v → z | 6,7,10,14,12* | 6,7,10,14*,12 |
| 5 | Return material particles | z → v | 6,7*,10,14,12 | 6*,7,10,14,12 |

Figure 4:
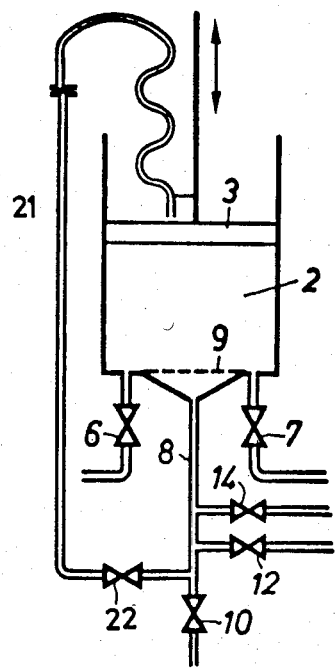
FIG. 4 shows a flushing water recycling system.

Valves denoted by * are open while other valves are closed.
z = Ram in rearward position
v = Ram in forward position FIG. 4 shows a partial view of a regenerating apparatus including a recycle for the squeezed-out water. In this case, the squeezed out water is not admixed to the efflux from the reactor, but is instead directly introduced into the press chamber through a conduit 21, which can be designed in part as a flexible hose, and includes a valve 22. The hose terminates just above the plunger and is secured to the shaft thereof. This device is operated in a manner similar to the regeneration process for achieving a fine regeneration discussed with respect to FIG. 3. Valve 22 is closed when the carrier material is compressed for removing of the undesired substances.

FIG. 5a shows, in a view, a special press plunger shape, i.e., a conical plunger which provides a larger pressing area than is possible with an equal diameter straight surface plunger. Furthermore, only one opening is required in this embodiment for feeding and discharging the particles. In this case, the two material conveying conduits connect into a single conduit communicating with the lower portion of the press chamber 2, while the conduit for removing the substances to be eliminated is connected laterally out of the lower portion of the press chamber below screen or plate 9. As can be seen from the top view shown in FIG. 5b, the conical shaped press is a perforated plate, except for the area corresponding to the outlet opening 23.

FIG. 6, shows another embodiment of the regenerating apparatus especially for cocurrent and countercurrent reactors in accordance with the operation of a diaphragm plunger. As compared with the regenerating apparatus employing a press plunger, for example, as shown in FIG. 1, compression in this case is achieved by means of a press diaphragm 24 which is moved to and fro by mechanical or hydraulic means between an extreme rearward position z and an extreme forward position v. The press chamber is connected through another valve 25, to the conduit 13 so that, as in the manner of operation of FIGS. 3 and 4, the portion of the press chamber 2, i.e., on the other side of the pressing surface of the diaphragm press, is employed as a storage area.

The regenerating steps when using the press diaphragm of FIG. 6 are compiled in Table III.

TABLE III

| Step | Procedure | Diaphragm Movement | Countercurrent Valve Position | Cocurrent Valve Position |
|---|---|---|---|---|
| 1 | Fill press chamber | v → z | 6*,7,10,14,12,25 | 6,7*,10,14,12,25 |
| 2 | Cleanse material particles by flushing | z ←→ v | 6,7,10,14,12,25* | 6,7,10,14,12,25* |
| 3 | Squeeze out substances to be removed | z → v | 6,7,10*,14,12,25 | 6,7,10*,14,12,25 |
| 4 | Take in carrier water | v → z | 6,7,10,14,12*,25 | 6,7,10,14*,12,25 |
| 5 | Return material particles | z → v | 6,7*,10,14,12,25 | 6*,7,10,14,12,25 |

Valves denoted by * are open while the other valves are closed.
z = Diaphragm in rearward position
v = Diaphragm in forward position From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the compressive regeneration of flexible, porous particulate material which is loaded with substances removed from liquids treated in a reactor in which the porous material is used as filter particles, oil-separating particles, or carrier, particles, which comprises regenerating the loaded material by:

conducting the loaded material together with liquid from the reactor into a press chamber associated with the reactor and having movable press means, with the porous material being drawn into the press chamber from the reactor by moving the press means in a rearward direction to create a suction effect; moving the press means forward after the loaded material has been drawn into the press chamber to press out the liquid and the loading substances from the loaded material while retaining the material in the press chamber; conducting additional liquid into the press chamber for dispersing the porous material in the additional liquid, by subsequently moving the press means rearwardly; and then moving the press means forward to force the regenerated material dispersed in the additional liquid back into the reactor.

2. A process according to claim 1, further comprising after filling the press chamber, pressing the liquid out of the loaded material by at least one partial forward movement of the press means; taking liquid into the press chamber by at least one partial, subsequently conducted rearward movement of the press means for cleaning the material by flushing; and, by a subsequent forward movement of the press means, pressing the liquid and the substances to be removed out of the material.

3. A process according to claim 2, wherein wastewater from the reactor is taken in as the liquid to clean the material by flushing.

4. A process according to claim 2, wherein fresh water is taken in as the liquid for cleaning the material by flushing.

5. A process according to claim 3 or 4, wherein the water for cleaning the material by flushing is introduced into the press chamber downstream from the press means relative to the stream flow when the press means forces water out of the press chamber.

6. A process according to claim 1, 2, 3 or 4, wherein the liquid taken in for transporting the regenerated flexible, porous material is wastewater from the reactor.

7. A process according to claim 1, 2, 3 or 4, wherein the liquid taken in for transporting the regenerated flexible, porous material is fresh water.

8. A process according to claim 5, wherein the water taken in for transporting the regenerated flexible, porous material is wastewater from the reactor.

9. A process according to claim 5, wherein the water taken in for transporting the regenerated flexible, porous material is fresh water.

10. A process according to claim. 2, 3 or 4 comprising forcing the substances out of the loaded flexible, porous material by compressing the material to about 20-5% of its expanded volume.

11. A process according to claim 5 comprising forcing the substances out of the loaded flexible, porous material by compressing the material to about 20-5% of its expanded volume.

12. a process according to claim 6 comprising forcing the substances out of the loaded flexible, porous material by compressing the material to about 20-5% of its expanded volume.

13. A process according to claim 7 comprising fdrcing the substances out of the loaded flexible, porous material by compressing the material to about 20-5% of its expanded volume.

14. A process according to claim 8 comprising forcing the substances out of the loaded flexible, porous material by compressing the material to about 20-5% of its expanded volume.

15. A process according to claim 9 comprising forcing the substances out of the loaded flexible, porous material by compressing the material to about 20-5% of its expanded volume.

16. A process according to claim 1, 2, 3 or 4, wherein the substances to be removed from the loaded flexible, porous material are removed by repeatedly compressing and expanding and simultaneously intaking and removing flushing liquid.

17. A process according to claim 10, wherein the substances to be removed from the loaded flexible, porous material are removed by repeatedly compressing and expanding and simultaneously intaking and removing flushing liquid.

18. A process according to claim 1, 2, 3 or 4 further comprising flowing compressed air into the liquid for transporting the regenerated material during the forcing of the regenerated material, dispersed in the liquid for transporting, into the reactor.

19. A process according to claim 1, 2, 3 or 4 wherein said press means is moved with a stroke velocity of about 0.01-0.5 m/sec.

20. A process according to claim 10, wherein said press means is moved with a stroke velocity of about 0.01-0.5 m/sec.

21. A process according to claim 17 wherein said partial forward movements of the press means are effected a sufficient number of times to remove at least 90% of loading substances.

22. A process according to claim 18 wherein about 5-250 $Nm^3air/m^3$ press chamber is flowed into the liquid for transporting the regenerated material into the reactor.

23. A process for the compressive regeneration of flexible, porous particulate material which is loaded with substances removed from liquids treated in a reactor in which the porous material is used as filter particles, oil-separating particles, or carrier particles, which comprises regenerating the loaded material by:
conducting the loaded material together with liquid from the reactor into a press chamber associated wtih the reactor and having movable press means, with the porous material being drawn into the press chamber from the reactor by moving the press means in a rearward direction to create a suction effect; moving the press means forward after the loaded material has been drawn into the press chamber to press out the liquid and the loading substances from the loaded material while retaining the material in the press chamber, said forcing out of the substances out of the loaded flexible, porous materials being effected by compressing the material to about 20-5% of its expanded volume; conducting additional liquid into the press chamber for dispersing the porous material in the additional liquid, by subsequently moving the press means rearwardly; and then moving the press means forward to force the regenerated material dispersed in the additional liquid back into the reactor.

24. A process according to claim 23 wherein said compression of the flexible materials is effected to about 15-7% of its expanded volume.

25. A process according to claim 23 wherein the flexible material regenerated is an open cell porous foam of one polyurethane, polyethylene, polypropylene and silicone, and has a density when dry of about 15-100 $kg/m^3$, compressibility of about 95-90% by volume and particle size of about 3-50 mm in diameter.

26. A process according to claim 25 wherein the flexible materials are retained in the press chamber during the compression step by means of a perforated plate having about 1-5 holes per 10 $cm^2$ of a diameter of about 2-10 mm.

27. A process according to claim 23 wherein the amount of additional liquid taken into the press chamber for dispersing the porous therein material is about 10-80% of the volume of the press chamber.

* * * * *